United States Patent [19]

Akamatsu

[11] Patent Number: 4,708,158
[45] Date of Patent: Nov. 24, 1987

[54] BALL-TYPE STOP COCKS HAVING STANDARD MATCHING FLANGES

[75] Inventor: Osamu Akamatsu, Kobe, Japan

[73] Assignee: Nippon Air Brake Co., Ltd., Kobe, Japan

[21] Appl. No.: 12,530

[22] Filed: Feb. 9, 1987

[30] Foreign Application Priority Data

Apr. 21, 1986 [JP] Japan .................. 61-60396[U]

[51] Int. Cl.⁴ .................... F16K 43/00; F16K 5/06
[52] U.S. Cl. .................... 137/315; 251/143; 251/152; 251/315; 251/316; 303/56
[58] Field of Search ............. 137/315; 251/142, 143, 251/145, 152, 315, 316, 317; 303/56

[56] References Cited

U.S. PATENT DOCUMENTS

| | | | |
|---|---|---|---|
| 3,056,577 | 10/1962 | Kulisek | 251/317 |
| 3,356,337 | 12/1967 | Olen | 251/317 |
| 3,661,355 | 5/1972 | Rawstron et al. | 251/315 |
| 3,674,052 | 7/1972 | Hartman et al. | 251/315 |
| 4,650,157 | 3/1987 | Sillaman et al. | 251/315 |

FOREIGN PATENT DOCUMENTS 200460 11/1958 Fed. Rep. of Germany ...... 251/315
113381 7/1960 Japan .
152272 10/1984 Japan .

Primary Examiner—George L. Walton
Attorney, Agent, or Firm—J. B. Sotak

[57] ABSTRACT

This invention relates to a flange-type stop cock having a ball valve plug. This ball-valve stop cock is so constructed as to have the same profile or outline as the flange portion of the existing flange-type stop cock having a conical-shaped valve plug. The flange mounting holes and the input and the output fluid openings are designed to conform with that of existing pipe seat brackets so that the present ball-shaped plug stop cock is a direct replacement for the conical-shaped plug stop cock.

6 Claims, 9 Drawing Figures

PRIOR ART

BALL-TYPE STOP COCKS HAVING STANDARD MATCHING FLANGES

FIELD OF THE INVENTION

This invention relates to a ball-type stop cock which is adapted to be secured to a mounting face or pipe seat bracket in an air brake control system for railroad cars having relay valves, solenoid valves, and other elements which are assembled together to form a single control device unit.

BACKGROUND OF THE INVENTION

Generally, stop cocks which are used on railroad cars are classified as E4103, E4104, and E4105 by the Japanese Industrial Standard (JIS). These standard cocks are normally the ones employed in conjunction with pipe mounts or mounting brackets. A simple form of stop cock includes a hollow body having a tapered plug which has an opening through it. When the plug is turned so that the holes in it correspond to the ports in the body, the liquid flowing in the pipe can pass through the cock. When the plug is turned so that the openings do not correspond, the flow is stopped.

An example of a prior art plug cock for pipe seat brackets for usage on railroad cars is shown and disclosed in Japanese official report invention or utility model registration application No. 59-152272. A specific embodiment based on this will be explained in detail below in relation to FIGS. 6 and 7. It will be seen that FIG. 6 is a partial sectional front view of a conventional plug-type stop cock while FIG. 7 is a plan view of the cock of FIG. 6.

As shown in both FIGS. 6 and 7, the stop cock includes a valve body having a pair of apertured mounting flange portions 10. This is, the two flanges 10 are located or formed on opposite sides of the valve body 1. The flanges 10 are adapted to be mounted to a pipe seat bracket surface 7 which is shown by phantom lines 7. A pair of bolt holes 10a and 10b are drilled at the end lobe portions of the flanges 10. The bolt holes 10a and 10b are in horizontal alignment along the longer side of the valve body 1. First and second passages 11 and 12 are drilled in the middle portion of the valve body 1. The open ends of the passages 11 and 12 face the open end plane 10c of the flange 10. The end plane 10c faces the planar surface of the pipe seat bracket 7. As shown in FIG. 7, the valve body 1 includes a first hole 13 which is formed on its outward end. The first hole 13 is connected to the first passage 11. The valve body 1 also includes a second hole 14 which is formed towards its outer extreme. The second hole 14 is connected to the second passage 12. As noted above, the open ends of the passagese 11 and 12 are formed parallel to the end planar surface 10c. A conical-shaped cock plug or frustrum of cone valve 8 is vertically-inserted between the first hole 13 and the second hole 14. It will be appreciated that the valve plug 8 is rotatable about its longitudinal axis. The valve plug 8 has a through opening 80 formed in the center thereof.

As shown, a movable handle 6 is fixed at the top end of the extension of the valve plug 8 outside the valve body 1 to open and close the valve plug 8 when it is rotated.

In viewing FIG. 6, it will be seen that a bottom cap member 9 is located on the end opposite the handle 6. That is, a threaded cap member 9 is screwed into the bottom end of the valve body 1. An internal pressure chamber 91 is formed between the bottom end of plug 8 and the upper, inner surface of cap 9. The chamber 91 is connected to the opening 80 via a passageway (not characterized). A spring member 92 is located in the pressure room 91 to force the valve plug 8 towards the handle side. That is, the compression spring 92 urges the conical plug 8 upwardly, as viewed in FIG. 6. In viewing FIG. 7, it will be seen that a pair of mounting holes 7a and 7b are formed in the seat 7, which are in alignment with bolt holes 10a and 10b. A pair of fluid passages 7c and 7d are formed in the seat 7, which are in alignment with the passages 11 and 12, respectively. The distance between the centers of the first hole 13 and the second hole 14 is represented by the means length L1, while the distance between the centers of the two bolt holes 10a and 10b is represented by the mean length In viewing FIGS. 6 and 7, it will be appreciated that the valve plug 8 is shown in its closed position in which there is no communication between the first hole 13 and the second hole 14 of the stop cock 1. Now, if the handle 6 is rotated by 90° to the right, the holes 13 and 14 will be fluidly interconnected via the passageway 80.

As described above, it was common practice to employ an apertured conical-shaped cock plug to close or to open the passages of a stop valve. However, such previous types of cocks have several disadvantages, such as, poor sealing and the need of great force to operate the handle 6. For these and other reasons, there has been a trend in recent years to replace the frustroconical plug valves used in railroad cars with ball-shaped plug valves. An example of a cock valve with a ball-shaped valve plug is shown and described in Japanese official report invention or utility model registration application No. 60-113381. An altered cock for use with pipe seats from a pipe-mounted cock is illustrated in FIGS. 8 and 9 of the drawings. It will be seen that FIG. 8 is a sectional view taken along section line D—D of FIG. 8. It will be noted that the same numbers are given to the equivalent or same parts as those shown in FIGS. 6 and 7. For convenience purposes, a detailed description of all of the parts will not be repeated.

In this second conventional embodiment, an inner hole 15 is formed between the first hole 13 and the second hole 14 in valve body 1. The open ends of holes 13 and 14 are aligned flush with the end plane 10c of the flanges 10. A ball-shaped valve plug 2 is housed and mounted for rotation in the inner hole 15 of the valve body 1. The valve plug 2 has a central opening or bore 20 which is adapted to open a fluid passage between the holes 13 and 14 when in its open position, and to close communication between the holes 13 and 14 when in its closed position. The valve plug 2 is supported at its two sides by two hollow seal seats 3. A hollow flat spring or belleville washer 4 is disposed between one of the seats 3 and the valve body 1. A hollow spacer 30 is located between the spring washer and one of the seats 3, against the valve plug 2 to sealingly rest against the two seats 3. A valve plug operating stem 5 is vertically-inserted into the valve body 1 which is located in the inner hole 15, as shown in FIG. 8. That is, the lower end of the inserted stem 5 includes a reduced portion which extends into and is locked in the slot or groove 21 provided therefor in the valve plug 2. A movable or rotatable handle 6 is fixed at the upper end of the valve stem 5, as shown in FIG. 8. Thus, the handle 6 is located on the upper outside portion of the valve body 1 and is adapted to be turned manually to thus rotate the stem 5, the reduced portion, and the ball 2.

In viewing FIGS. 8 and 9, it will be noted that the valve plug 2 is shown in its open position for connecting the two holes 13 and 14. Now, when the handle 6 is rotated by 90°, the valve plug 2 will close the passage between the holes 13 and 14.

It will be seen that in a stop cock for pipe seats having a ball-shaped valve plug in the conventional design illustrated in FIGS. 8 and 9, the center-to-center dimension L1' between the first hole 13 and the second hole 14 is larger than the center-to-center dimension L1 of a conventional stop cock for pipe seats having a frusto-conical valve plug, as shown in FIGS. 6 and 7. Because of its ball-shape, the diameter of the valve plug 2 is comparatively larger and having an opening size equivalent to the opening 80 of the cone-shaped valve plug 8. In addition, the seats 3, which seal, bed, and support the ball valve plug 2, and the spring 4 which provides uniform sealing, are located along the side of valve plug 2 between the first and the second holes 13 and 14. This also results in a problem because the center-to-center dimension L2' between the bolt holes 10a and 10b is larger than the center-to-center dimension L2 between bolt holes 13 and 14 of the frustro-conical stop cock. Thus, it is impossible to directly attach the ball-shaped stop cock of FIGS. 8 and 9 to a central piping seat bracket 7, as shown in FIGS. 6 and 7. Accordingly, the two stop cocks are not compatible devices and cannot be used as direct replacements for each other.

This problem is due to the design which requires the first hole 13 and the second hole 14 to be in straight alignment, and the pipe seat 7 to be parallel with the planar surface 10c of the flange 10. The first hole 13, the spring 4, the seats 3, the ball-shaped valve plug 2, as well as the second hole 14, of FIGS. 8 and 9 are incompatible with the fluid passage holes and bolt holes of FIGS. 6 and 7.

SUMMARY AND OBJECTS OF THE INVENTION

In the subject invention, the following solutions are used to alleviate the above-noted problems. In the present stop cock for pipe seat brackets, which has a ball-shaped valve plug, the first and second holes are now rearranged so that they are aligned perpendicular to the horizontal plane of the flange which is adjacent a pipe seat bracket. One of the two holes is made adjacent the inward-side of the mounting flange, while the other hole is made on the outward side of the ball-shaped plug of the valve body. The hole which is located on the outward-side of the valve body, opposite from the mounting flange, is interconnected through a passage formed in the bottom of the valve body opposite the operating handle.

With this technological redesign, the dimension of the valve body along the direction parallel to the mounting flange face is the same as that of the conventional types of presently-used cocks due to the location of the first hole, the valve plug, the second hole, and other elements in which the first hole and the second hole are aligned perpendicular to the plane of the flange at the pipe seat side. It thus becomes possible to make holes the same distance apart as in the existing cocks. Therefore, existing cocks with cone-shaped valve plugs can be readily replaced by the presently-invented cocks with ball-shaped valve plugs without modifications to the pipe seat.

In accordance with the present invention, there is a stop cock adapted to be mounted on an existing standard pipe seat bracket comprising, a flange formed on one side of the stop cock which is fastened to the pipe seat bracket, a first passage and a second passage are drilled in the middle of the plane surface of the flange, a first hole which is to be connected to the first passage and a second hole which is connected to the second passage are made on the respective front and back sides of the valve body, a through hole is drilled into a ball-shaped valve plug between the first hole and the second hole, the ball-shaped valve plug is situated between the first hole and the second hole to open or close fluid communication therebetween, the valve plug is supported on seat members disposed on the respective sides thereof, a valve plug stem is inserted in and locked to the valve plug, a rotatable handle is fixed to the outer end of the stem, the first and second holes are arranged to align perpendicular to the flange face, one of the first and second holes is situated in the flange-side while the other hole is situated on the opposite side of the body from the flange, the second hole which is formed in the bottom-side of the valve body opposite the flange is interconnected through a lower passageway formed in the valve body opposite the handle.

BRIEF DESCRIPTION OF THE DRAWINGS

The above objects and other attendant features and advantages will be more readily appreciated as the present invention becomes better understood by reference to the following detailed description when considered in conjunction with the accompanying drawings, wherein.

DETAILED DESCRIPTION OF THE INVENTION

Figure 1:
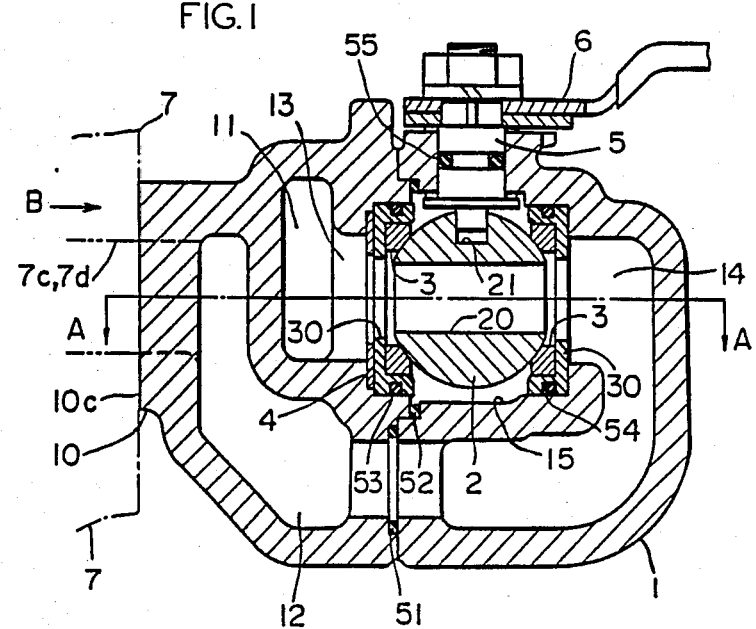
FIG. 1 is a side, sectional view of a first embodiment of a ball-shaped valve plug of a stop cock of the present invention.

The following is a numerical listing of some of the elements or parts of a stop cock assembly, which are shown in FIGS. 1 through 9 of the drawings:

1—valve body
2—valve plug
3—sealing seat
4—spring biasing element
5—valve plug stem
6—rotatable handle
7—pipe seat bracket
10—valve flange 11—first passage
12—second passage
13—first hole
14—second hole
15—central space
20—through hole.

Referring now to the drawings, it will be appreciated that two embodiments of the subject invention will be described in FIGS. 1 through 5. As mentioned above, the same numbers are given to the equivalent parts as the ones previously discussed in relation to the stop cocks shown in FIGS. 6, 7, 8, and 9.

Figure 2:
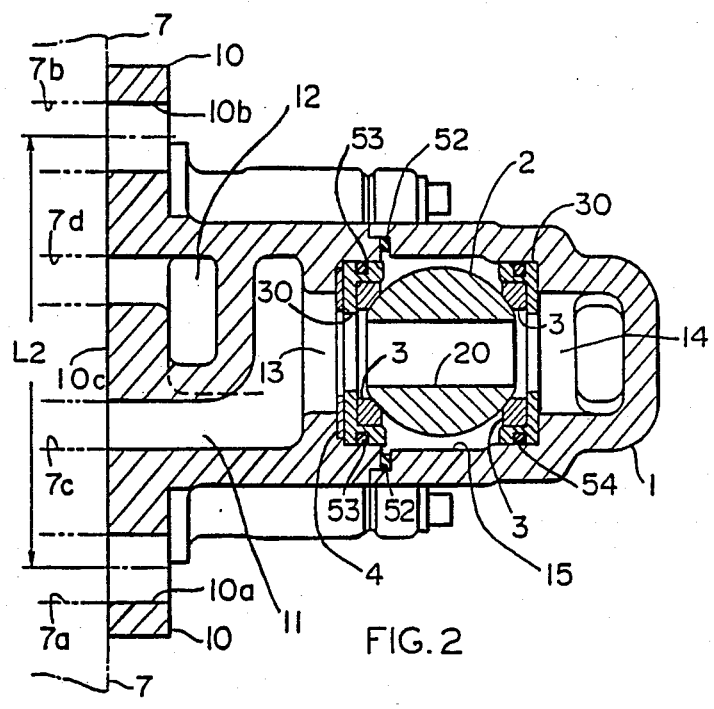
FIG. 2 is a top, sectional view taken along line A—A of FIG. 1.
Figure 3:
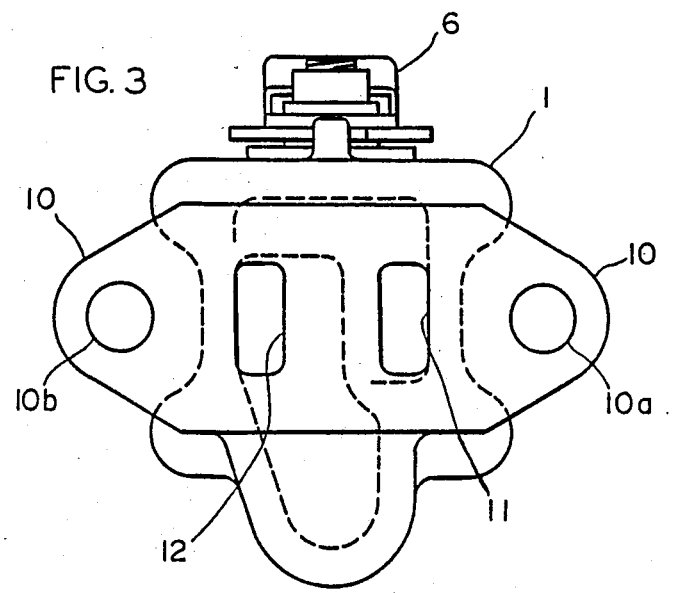
FIG. 3 is a rear plan view of the stop cock as sighted along the arrow B of FIG. 1.

The first embodiment of the unique ball-shaped plug stop cock is shown in FIGS. 1, 2, and 3. As previously noted, FIG. 1 is a side, sectional view, and FIG. 2 is a top, sectional view taken along line A—A of FIG. 1. FIG. 3 is a rear, plan view being sighted in the direction of arrow B in FIG. 1.

This first embodiment mainly differs from the normal conventionally-designed, ball-shaped plug stop cock in the following manner:

As shown, the first hole port 13 is formed on the flange-side, namely the left, inner-side as viewed in FIG. 2 of the valve plug 2. Conversely, the second hole or output port 14 is located at the opposite side from the flange 10, namely the right, outer-side as viewed in FIG. 2. The direction of fluid flow from the first hole 13 to the second hole 14 is thus perpendicular to the planar surface 10c of the flange 10, which faces the matching flat surface of the pipe seat bracket 7. As shown in FIG. 1, the second hole 14 passes downwardly toward the bottom-side of the valve body 1, which is opposite the top-side on which the handle is mounted. The output port or hole 14 is in communication with the second passage 12, which is located on the bottom-side of the valve body 1. As seen in FIGS. 1 and 2, the first passageway 11 opens to match the fluid opening 7d formed in the bracket 7. It will be seen that the first hole 13 is in communication with the first passage 11, which opens to fluid opening 7c formed in the bracket 7. A plurality of seats or O-rings 51, 52, 53, 54, and 55 are suitably located to provide sealing members for the respective valve elements. A central cavity 15 is located internally within the body 1 to accommodate the ball-shaped valve member 2, the apertured seat seals 3, the spacers 30, and the spring washer 4. After the stem 5 is inserted into the rectangular aperture 21, formed in the top of the ball plug 2, and into the top of the outer body member, the rotatable handle 6 is bolted to the top of the outer member, and the two body members are bolted together. Thus, the through hole 20 opens and closes a fluid communication path between the first and second holes 13, 14 when the handle 6 is rotated 90°. The valve body is made up of two parts or main members; that is, the first part is located on the inner flange side, and the second part is located on the outer side opposite the flange.

Figure 4:
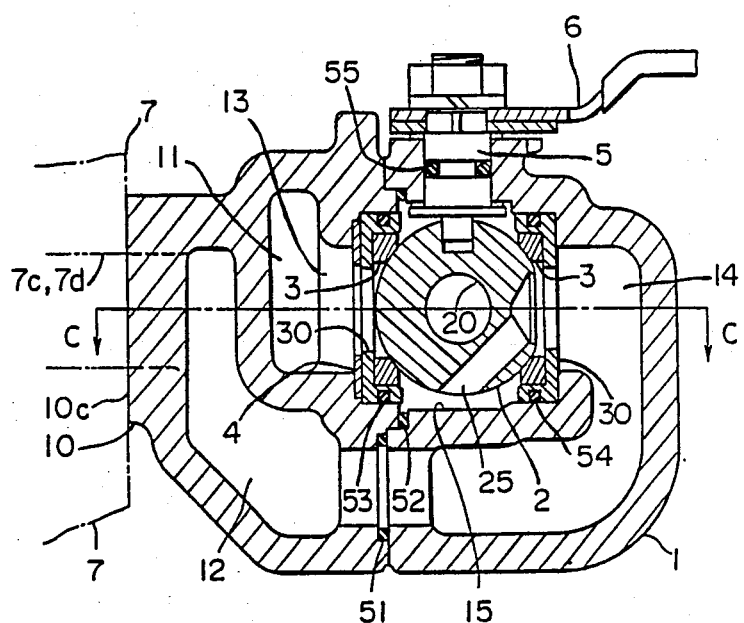
FIG. 4 is a side, sectional view of a second embodiment of another type of ball-shaped valve plug of a stop cock of the present invention.
Figure 5:
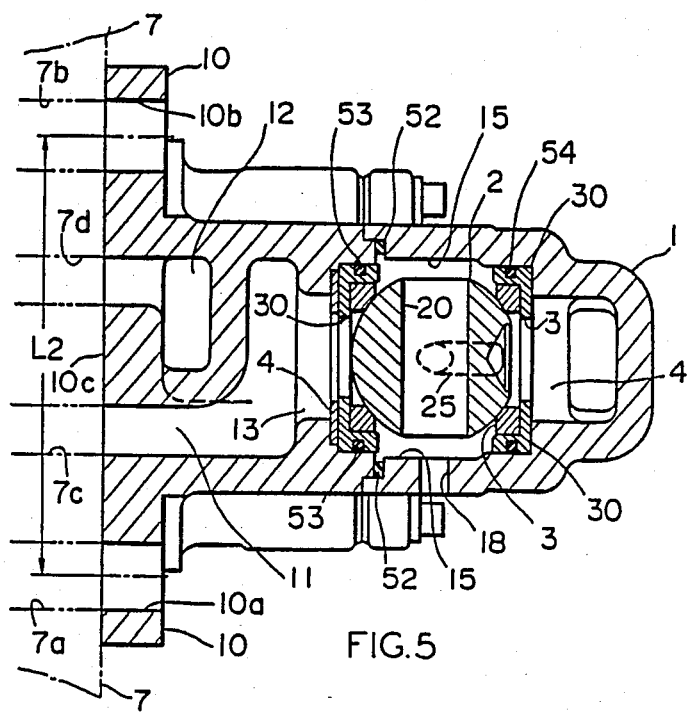
FIG. 5 is a top, sectional view taken along line C—C of FIG. 4.
Figure 6:
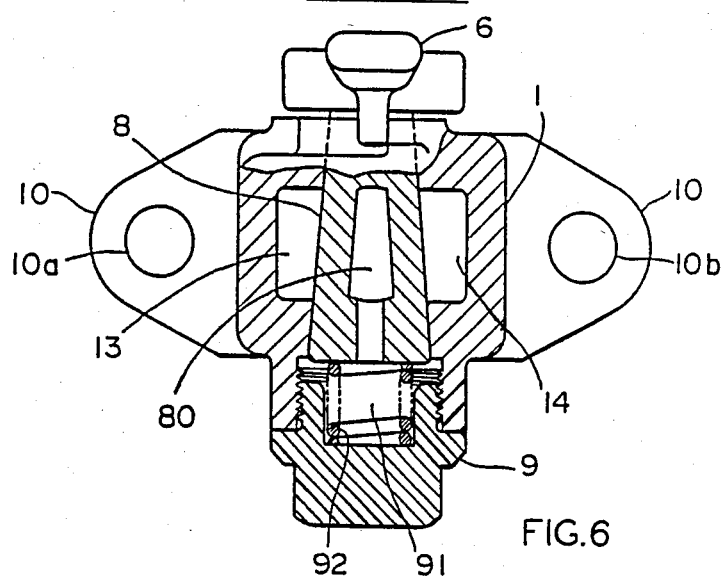
FIG. 6 is a partial, front, sectional view of a conventional-type of pipe seat mounting bracket for a standard stop cock having a cone-shaped valve plug.
Figure 7:
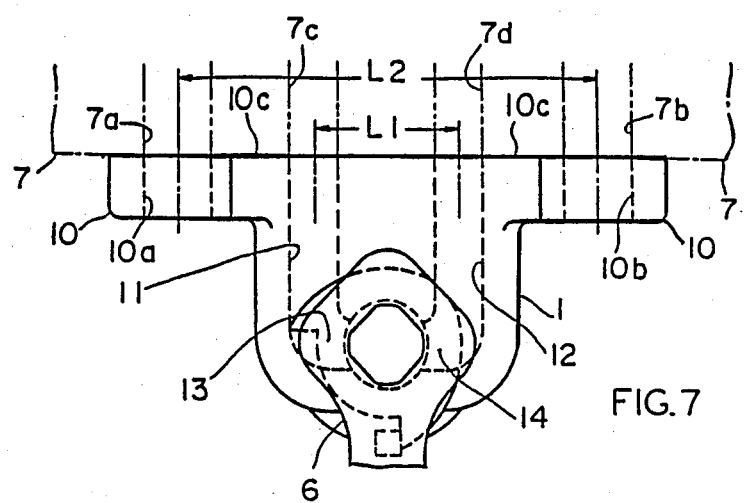
FIG. 7 is a top, plan view of the stop cock of FIG. 6.
Figure 8:
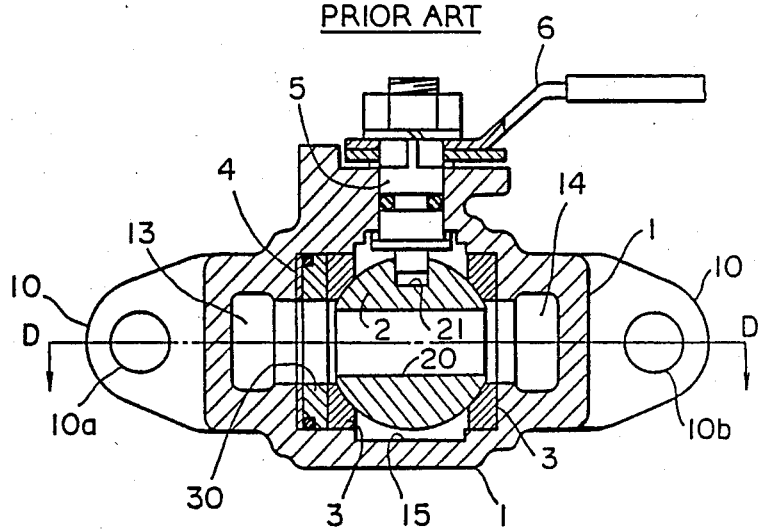
FIG. 8 is a partial, front, sectional view of the conventional-type of pipe seat mounting bracket but with a stop cock having a ball-shaped valve plug.
Figure 9:
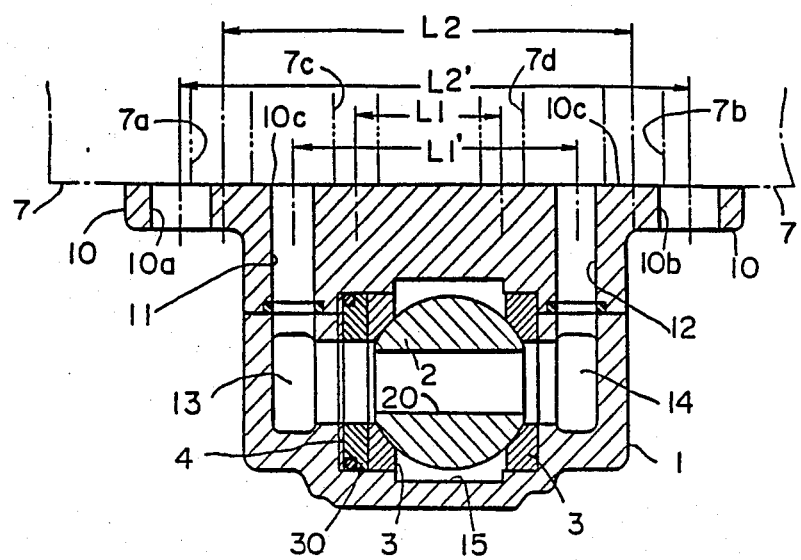
FIG. 9 is a top, sectional view taken along line D—D of FIG. 8.

Referring now to FIGS. 4 and 5, there is illustrated a second embodiment of the present invention. As previously noted, FIG. 4 is a sectional view of the second stop cock, while FIG. 5 is a top, sectional view taken along line C—C of FIG. 4. The second stop cock differs from the first stop cock in the following manner. The center of the opening 20 in the valve plug 2 is normally aligned parallel to the flange face 10c. A side hole 25 is drilled in the valve plug 2, while a vent hole 18 is made in the left side of the valve body 1 as shown in FIG. 5. The same numbers are given to each of the stop cock elements having like counterparts as depicted in FIGS. 1 and 2. A detailed description of the like parts of FIGS. 4 and 5 will not be repeated for the sake of convenience.

In both embodiments of the subject invention, the dimension of the valve body measured along the planar surface of the flange at the pipe seat bracket side can be made exactly the same as that of the existing cocks having cone-shaped valve plugs. This is made possible by arranging the first hole, the valve plug, and the second hole to align perpendicular to the plane facing the pipe seat bracket. As a result, the invented stop cock can be easily mounted on the existing pipe seat bracket in place of the conventional cock without any modifications to the matching seat of the stop cock.

The conventional cock having a cone-shaped valve plug has a pressure chamber in the side opposite the handle. When this plug is replaced by a ball-shaped plug, this pressure chamber is simply an empty space. In this invention, this empty space is effectively used as a bypass to the first or second hole made at the opposite side of the valve body from the flange. As a result, the dimension of the invented stop cock along its valve plug stem is also comparable to that of the conventional cock having a cone-shaped valve plug. Thus, the stop cocks of the present invention are direct replacements for existing stop cocks having conical types of plugs, since the bolt mounting holes and the fluid path opening are the same.

Thus, the present invention has been described in such full, clear, concise and exact terms as to enable any person skilled in the art to which it pertains to make and use the same, and having set forth the best mode contemplated of carrying out this invention. I state that the subject matter, which I regard as being my invention, is particularly pointed out and distinctly asserted in what is claimed. It will be understood that variations, modifications, equivalents and substitutions for components of the above specifically-described embodiment of the invention may be made by those skilled in the art without departing from the spirit and scope of the invention as set forth in the appended claims.

I claim:

1. A stop cock adapted to be mounted on an existing standard pipe seat bracket comprising, a flange formed on one side of the stop cock which is fastened to the pipe seat bracket, a first passage and a second passage are formed in the middle of the plane surface of the flange, a first hole which is to be connected to the first passage and a second hole which is to be connected to the second passage are made on the respective front and back sides of the valve body, a through hole is drilled into a ball-shaped valve plug between the first hole and the second hole, the ball-shaped valve plug is situated between the first hole and the second hole to open or close fluid communication therebetween, the valve plug is supported on seat members disposed on the respective sides thereof, a valve plug stem is inserted in and locked to the valve plug, a rotatable handle is fixed to the outer end of the stem, the first and second holes and said through hole forms a communication path which is arranged to align perpendicular to the flange face, one of the first and second holes is situated in the flange side while the other hole is situated on the opposite side of the body from the flange, the second passage which is formed in the bottom-side of the valve body opposite the flange is interconnected through a lower passageway formed in the valve body opposite the handle, said passages and said holes are arranged in the above manner so that an existing stop cock with a cone shape valve plug can be replaced by the present invented stop cock with a ball-shaped valve plug without any modifications to the standard pipe seat bracket.

2. A stop cock, as defined in claim 1, wherein a pair of mounting holes are formed on the respective lobes of the flange, which have center-to-center dimension equal to a pair of mounting holes formed in the bracket.

3. A stop cock, as defined in claim 1, wherein said second passage is located beneath said first passage.

4. A stop cock, as defined in claim 1, wherein said first and second passages terminate in fluid openings which match fluid openings formed in the pipe seat bracket.

5. A stop cock, as defined in claim 4, wherein the fluid openings are disposed in side-by-side relationship with each other.

6. A stop cock, as defined in claim 1, wherein a rotatable handle is connected to the ball-shaped valve plug for opening and closing fluid communication between said first and second holes.

* * * * *